United States Patent
Surjaatmadja et al.

(10) Patent No.: US 9,845,670 B2
(45) Date of Patent: Dec. 19, 2017

(54) IMMISCIBLE FLUID SYSTEMS AND METHODS OF USE FOR PLACING PROPPANT IN SUBTERRANEAN FORMATIONS

(71) Applicant: Halliburton Energy Services, Inc., Houston, TX (US)

(72) Inventors: Jim Basuki Surjaatmadja, Duncan, OK (US); Stanley V. Stephenson, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 134 days.

(21) Appl. No.: 14/692,534

(22) Filed: Apr. 21, 2015

(65) Prior Publication Data

US 2016/0312595 A1 Oct. 27, 2016

(51) Int. Cl.
| | |
|---|---|
| *E21B 43/267* | (2006.01) |
| *E21B 43/16* | (2006.01) |
| *E21B 43/25* | (2006.01) |
| *C09K 8/66* | (2006.01) |
| *C09K 8/80* | (2006.01) |

(52) U.S. Cl.
CPC ............ *E21B 43/267* (2013.01); *C09K 8/665* (2013.01); *C09K 8/805* (2013.01)

(58) Field of Classification Search
CPC ...... E21B 43/267; E21B 43/26; E21B 43/261; C09K 8/665; C09K 8/72; C09K 8/80; C09K 8/805

See application file for complete search history.

(56) References Cited

U.S. PATENT DOCUMENTS

| | | | |
|---|---|---|---|
| 7,946,340 B2 | 5/2011 | Surjaatmadja et al. | |
| 8,540,024 B2 | 9/2013 | Kosarev et al. | |
| 8,636,065 B2 | 1/2014 | Lesko et al. | |
| 8,763,699 B2 | 7/2014 | Medvedev et al. | |
| 2014/0131041 A1 | 5/2014 | Liang et al. | |
| 2014/0144634 A1 | 5/2014 | Nguyen et al. | |

(Continued)

OTHER PUBLICATIONS

Inyang et al. "Development and Field Applications of Highly Conductive Proppant free Channel Fracturing Method" SPE-168996, Apr. 1-3, 2014.*

(Continued)

*Primary Examiner* — Angela M DiTrani
*Assistant Examiner* — Charles R Nold
(74) *Attorney, Agent, or Firm* — Craig W. Roddy; Baker Botts L.L.P.

(57) ABSTRACT

Systems and methods for placing proppant in a portion of a subterranean formation (e.g., in a fracturing operation) using two or more immiscible fluids are provided. In certain embodiments, the methods comprise: introducing into a well bore penetrating a portion of a subterranean formation alternating stages of a first treatment fluid comprising one or more proppants, and a second treatment fluid comprising a lesser concentration of proppants than the first fluid, wherein the first fluid and the second fluid are substantially immiscible in one another, and wherein the alternating stages of the first and second treatment fluids are introduced into the well bore at or above a pressure sufficient to create or enhance one or more fractures in the subterranean formation.

12 Claims, 5 Drawing Sheets

(56) References Cited

U.S. PATENT DOCUMENTS

2014/0251610 A1* 9/2014 Brannon ............... E21B 43/267
166/280.1
2014/0374093 A1 12/2014 Nguyen et al.

OTHER PUBLICATIONS

Babatunde et al. "Channel Hydraulic Fracturing and its Applicability in the Marcellus Shale" SPE 149426, 2010.*
Tinsley, J. M., and J. R. Williams Jr. "A new method for providing increased fracture conductivity and improving stimulation results." Journal of Petroleum Technology 27.11 (1975): 1-319.
Gillard, Matthew Robert, et al. "A new approach to generating fracture conductivity." SPE Annual Technical Conference and Exhibition. Society of Petroleum Engineers, 2010.

* cited by examiner

IMMISCIBLE FLUID SYSTEMS AND METHODS OF USE FOR PLACING PROPPANT IN SUBTERRANEAN FORMATIONS

BACKGROUND

The present disclosure relates to systems and methods for use in subterranean fracturing operations and other operations where proppant is placed in a subterranean formation.

In the production of hydrocarbons from a subterranean formation, the subterranean formation should be sufficiently conductive to permit the flow of desirable fluids to a well bore penetrating the formation. One type of treatment used in the art to increase the conductivity of a subterranean formation is hydraulic fracturing. Hydraulic fracturing operations generally involve pumping a treatment fluid (e.g., a fracturing fluid or a "pad fluid") into a well bore that penetrates a subterranean formation at or above a sufficient hydraulic pressure to create or enhance one or more pathways, or "fractures," in the subterranean formation. These fractures generally increase the permeability and/or conductivity of that portion of the formation. The fluid may comprise proppants particulates, often referred to as "proppants," that are deposited in the resultant fractures. The proppants particulates are thought to help prevent the fractures from fully closing upon the release of the hydraulic pressure, forming conductive channels through which fluids may flow to a well bore.

In certain fracturing treatments, proppant may be introduced into a subterranean formation by sequentially injecting into the well bore alternating stages of carrier fluids carrying different amounts of proppant. These methods have been described as forming "pillars" of proppant in the open space of a fracture and flow channels between those pillars which may optimize the conductivity of the fracture. Conductor$^{SM}$ Fracturing Service (available from Halliburton Energy Services, Inc.) is one example of a commercially-available service that has provided these types of treatments.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for use in subterranean fracturing operations and other operations where proppant is placed in a subterranean formation. More particularly, the present disclosure relates to systems and methods for placing proppant in a portion of a subterranean formation (e.g., in a fracturing operation) using two or more immiscible fluids.

The present disclosure provides methods and systems that introduce alternating stages of proppant-carrying treatment fluids (e.g., proppant-laden fluids) and treatment fluids comprising a lesser concentration of proppant (referred to herein as the "clean fluid") into a subterranean formation, wherein the proppant-carrying fluid and the clean fluid are substantially immiscible in one another. As used herein, a "proppant-free" clean treatment fluid refers to a fluid that does not include a significant concentration of proppants. However, a "clean" fluid still may comprise some significant concentration of proppants, and "clean" or "proppant-free" fluids may still comprise other materials and/or additives such as diverting agents.

In prior fracturing treatments involving the pumping of alternating stages of proppant-laden treatment fluids and clean treatment fluids, while those fluids travel through conduits in treatments systems, well bores, and/or fractures in the formations themselves to the intended destination of the proppant, it is believed that those fluids will mix together due at least in part to friction between the fluid(s) and the internal surfaces of the regions through which they flow. This mixing may reduce the ability of these fluids to form discrete "pillars" of proppant and/or open "channels" between them within a subterranean formation. Without limiting the disclosure to any particular theory or mechanism, it is believed that flowing a fluid (e.g., an oil-based fluid) through one of those regions may temporarily render the internal surfaces of those regions more "phobic" to different types of fluids. This may temporarily reduce friction between those surfaces and different types of fluids subsequently flowing therethrough, for example, that are immiscible in the prior fluid (e.g., a water-based fluid), and thus reducing the degree to which the fluids may mix as they flow through those regions.

Figure 1A:
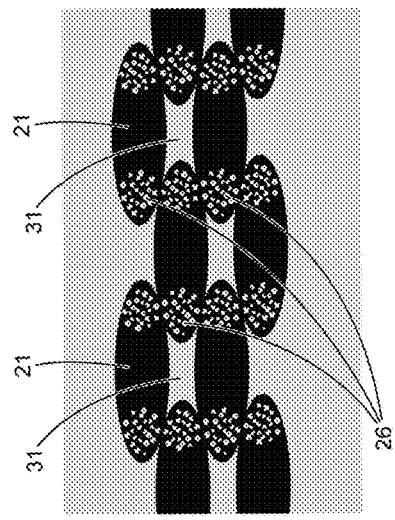
FIGS. 1A and 1B are diagrams illustrating fluids and emulsions of the present disclosure in a region of a subterranean formation, and deposits of proppants remaining in the formation after the fluids and emulsions are removed.
Figure 1B:
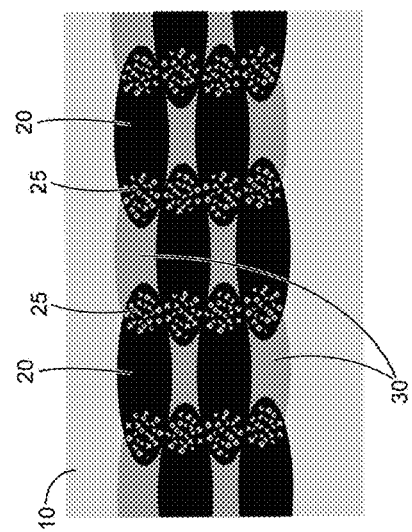

However, it is also believed (without limiting the disclosure to this theory or mechanism) that immiscible fluids will inherently mix, forming emulsions at the interfaces between intervals of those fluids. A two-dimensional, idealized illustration of such emulsions in a formation is illustrated in FIG. 1A, which shows portions of fluids of the present disclosure in a subterranean formation 10 (e.g., within a fracture). As shown, the bulk of the intervals of proppant-carrying fluid 20 and the clean fluid (i.e., the fluid comprising a lesser concentration of proppant) 30 remain substantially immiscible, but also form emulsions 25 at their interfaces. When the phase of those emulsions comprised of the clean fluid is removed, as shown in FIG. 1B, the proppant-carrying fluid remains, which results in the formation of pillars of proppant 21 with conductive open spaces 31 therebetween. Where the emulsions were previously located, region 26 of smaller open spaces (where the phase of the emulsion comprising the clean fluid was) interspersed with smaller "pillars" of proppant (where the phase of the emulsion comprising the proppant-carrying fluid was) may be left. Formation fluids such as crude oil or other hydrocarbons may then flow into open spaces 31 and the smaller open spaces in region 26. In a three-dimensional space comprising numerous of these regions layered on top of one another, open spaces 31 and regions 26 of open spaces may permit the flow of hydrocarbons or other fluids therethrough, contributing to the conductivity of the proppant pack.

Figure 5:
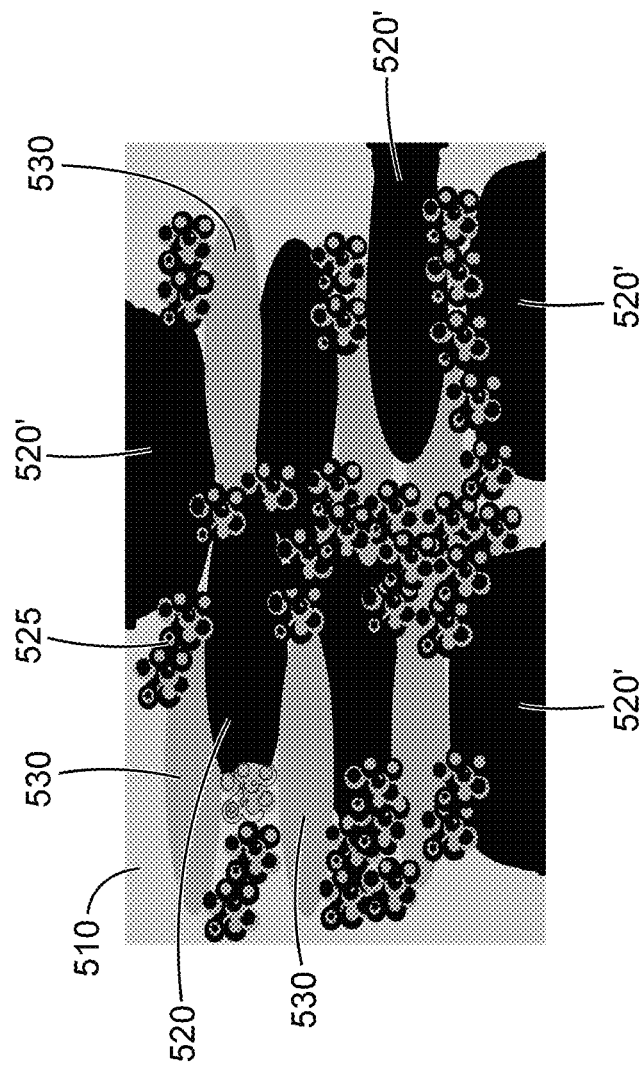
FIG. 5 is a diagram illustrating further detail of certain emulsions of the present disclosure in a region of a subterranean formation as shown in FIG. 1A.

A more detailed depiction of portions of immiscible fluids introduced into a subterranean formation (e.g., within a fracture) according to the present disclosure similar to that shown in FIG. 1A is provided in FIG. 5. As shown in FIG. 5, the bulk of the intervals of proppant-carrying fluid 520 and the clean fluid 530 remain substantially immiscible, but also form emulsions 525 at their interfaces. These emulsions are shown and may be observed as groups of "bubbles" of the immiscible fluids. These bubbles are depicted in FIG. 5 as being round in shape, although the shapes of these bubbles of fluids may vary in reality. In certain embodiments, one or more bubbles of one fluid (e.g., the clean fluid) also may form within a larger bubble of another immiscible fluid (e.g., the proppant carrying fluid), as shown in FIG. 5. When the phase of the emulsion comprised of the clean fluid is removed (similarly to the action described with respect to FIG. 1B above), the inner bubble of the clean fluid may leave behind an even smaller open space or channel within the small "pillar" of proppant left by the outer bubble of the proppant carrying fluid. The emulsions or groups of bubbles also may be characterized themselves as large masses of bubbles, which may form complex, interconnecting structures between the larger deposits of the proppant-carrying fluid 520 and the clean fluid 530. Finally, if the formation or fracture 510 contains oil, the walls or surfaces within that formation or fracture will be oil-wet. The attraction between the oil-based fluids of the present disclosure (in this case, the proppant carrying fluid 520) and the oil-wet surfaces within the formation or fracture 510 may cause the portions of those fluids 520' proximate to the surfaces or walls of the formation or fracture 10 to spread out along the region where they interface with the wall or surface. Conversely, in a formation or fracture that contains water, the aqueous-based fluids of the present disclosure would similarly spread out along the region where they interface with the water-wet wall or surface in the formation.

In certain embodiments of the present disclosure, the proppant-carrying fluid may be selected such that the proppant-carrying fluid will form the internal phase of the emulsion. This may be accomplished by selecting a base fluid for the proppant-carrying fluid having a higher or lower surface tension (as compared to the clean treatment fluid), or by using certain emulsifiers or surfactants to control the phases of the emulsion. Without limiting the disclosure to any particular theory or mechanism, it is believed that the interfacial region between the proppant-carrying phase and the clean phase of the emulsion will be much more contained (e.g., the two-fluid system does not naturally mix). Also, it is believed and assumed that a proppant, originally placed in one-fluid system will stay in that fluid system, although eventually, the fluid that has a stronger affinity to it may eventually "consume" the proppant. Between immiscible and miscible globs of fluid within a fracture in a formation, a higher surface tensioned glob will likely coalesce with another glob of similar fluid faster than two lower surface tensioned globs may coalesce. For example, water, having a higher surface tension than oil, would coalesce more easily, and hence, would readily function as the external phase of the emulsion. Two globs of a lower fluid tension that are near each other, on the other hand, tend to be separated (e.g., pried away) by the high tension fluid. For this reason, it is believed that, in certain embodiments of the present disclosure, the proppant will be mixed into and remain in the lower stressed, internal phase fluid, which may more readily form pillars in the formation.

Figure 2A:
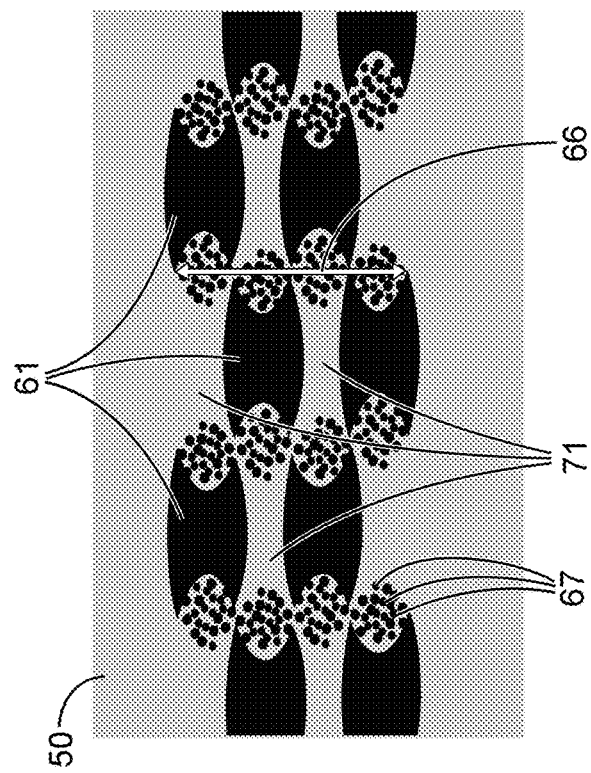
FIGS. 2A and 2B are diagrams illustrating fluids and emulsions of the present disclosure in a region of a subterranean formation, and deposits of proppants remaining in the formation after the fluids and emulsions are removed.
Figure 2B:
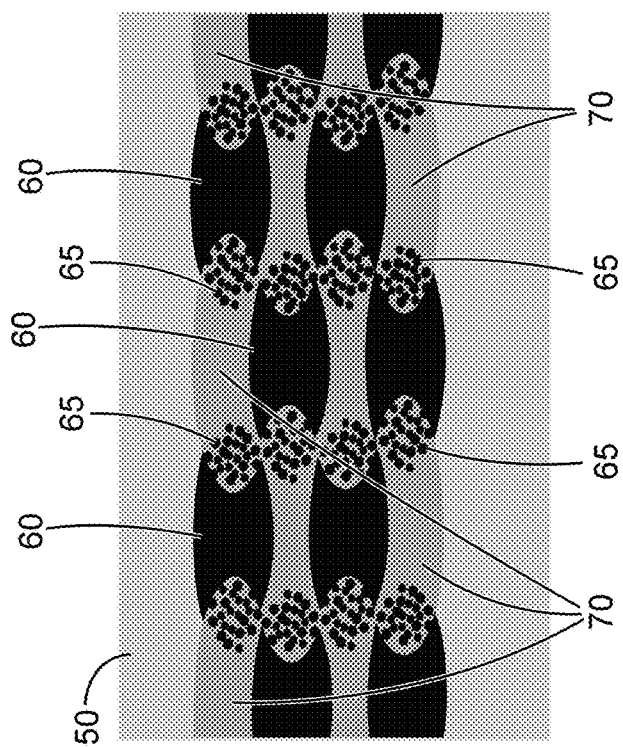

An example of this arrangement is shown in FIG. 2A, which is a two-dimensional idealized representation of such emulsions in a formation 50 similar to that shown in FIG. 1A, but where the proppant is in the internal phase of the interfacial emulsions 65 of the intervals of the proppant-carrying fluid 60 and the clean fluid 70. When the clean treatment fluid 70 (i.e., the external phase of the emulsion) is removed from the formation 50 (e.g., is produced out of the formation through the well, or leaks off elsewhere into the formation), as shown in FIG. 2B, the open spaces 71 left between the pillars of proppant 61 are connected to one another, forming channels 66 through the proppant pack that are conductive along the direction indicated. Formation fluids such as crude oil or other hydrocarbons may then flow into open spaces 71 and channels 66. Moreover, due to the presence of proppant in the internal phases of the aforementioned emulsions, "micropillars" 67 of proppant may be formed within those channels 66, which may add greater stability to the proppant pack. In certain embodiments, these "micropillars" 67 subsequently may be removed from the formation (e.g., by acidizing and/or pressurized displacement of the micropillars), among other reasons, to further increase the open space and conductivity of the channels in the proppant pack.

It should be noted that, where extensive emulsions are created having "bubbles" of a fluid within "bubbles" of an immiscible fluid (e.g., as shown in FIG. 5), the higher stressed (external) phases of the bubble-in-bubble structure tend to burst or coalesce, eventually producing emulsion structures resembling those in FIGS. 2A and 2B.

Among the many potential advantages to the methods, compositions, and systems of the present disclosure, only some of which are alluded to herein, the methods, compositions, and systems of the present disclosure may improve the separation between intervals of proppant-carrying fluid and clean fluid in fracturing operations and thus enable the more effective placement of proppants in subterranean fractures in the form of "pillars" of proppant and/or open "channels" therebetween. In certain embodiments, the methods, compositions, and systems of the present disclosure may enable the formation of larger proppant "pillars" and/or open "channels" therebetween in a formation. Thus, in certain embodiments, proppant packs formed using the methods, compositions, and/or systems of the present disclosure may, among other benefits, exhibit improved compressive strength, porosity, and/or conductivity as compared to proppant packs formed using different methods or systems. In certain embodiments, the methods and systems of the present disclosure may enable the more efficient use of fracturing equipment at a well site, for example, where two different systems used to pump the proppant-carrying fluid and clean fluid may be used to perform fracturing jobs in multiple different wells substantially simultaneously (as will be described in further detail below with respect to FIG. 4).

The treatment fluids (e.g., the proppant-carrying fluids and/or clean fluids) used in the methods and systems of the present disclosure may comprise any base fluid known in the art, including aqueous base fluids, non-aqueous base fluids, and any combinations thereof. Any pairs or combinations of substantially immiscible base fluids may be used in the methods and systems described herein, including but not limited to "water-based" fluids and "oil-based fluids". The term "base fluid" and derivatives of that term refer to the major component of the fluid (as opposed to components dissolved and/or suspended therein), and does not indicate any particular condition or property of that fluids such as its mass, amount, pH, etc.

Aqueous or water-based fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate.

Examples of non-aqueous fluids (e.g., oil-based fluids) that may be suitable for use in the methods and systems of the present disclosure include, but are not limited to, oils, hydrocarbons, organic liquids, and the like. In certain embodiments, such fluids may comprise mineral oil based fluids or mineral oil/paraffin based fluids. Examples of commercially-available oil-based fluids that may be suitable for use in the methods and systems of the present disclosure include, but are not limited to, those in ACCOLADE®, ENCORE®, INTEGRADE®, INNOVERT®, ENVIRO-MUL™, PETROFREE®, and My-T-Oil™ fluids, each of which is available from Halliburton Energy Services, Inc. Examples of commercially-available base oils for use in the oil-based fluids of the present disclosure include, but are not limited to ESCAID® 110 desulfurized hydrogenated kerosene oil base from ExxonMobil, USA in Houston, Tex. and ExxonMobil Chemical Company in Houston, Tex., XP-07™ (synthetic normal alkane fluid available from Halliburton Energy Services), and PUREDRILL™ drilling fluids (available from Petro-Canada). In other embodiments, the oil-based fluids of the present disclosure may comprise a synthetic oil comprising an ester or olefin; a diesel oil; or a mineral oil selected from the group consisting of n-paraffins, iso-paraffins, cyclic alkanes, branched alkanes, or any mixture thereof.

The proppants particulates used in the methods and systems of the present disclosure may comprise any suitable particulate material known in the art that is capable of being deposited in one or more of the fractures in the formation (whether created, enhanced, and/or pre-existing). Examples of proppants may include: bubbles or microspheres, such as made from glass, ceramic, polymer, sand, and/or another material. Other examples of proppants may include particles of any one or more of: calcium carbonate ($CaCO_3$); barium sulfate ($BaSO_4$); organic polymers; cement; boric oxide; slag; sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and combinations thereof. Suitable composite particulates may comprise a binder and a filler material wherein suitable filler materials may include any one or more of: silica; alumina; fumed carbon; carbon black; graphite; mica; titanium dioxide; meta-silicate; calcium silicate; kaolin; talc; zirconia; boron; fly ash; hollow glass microspheres; solid glass; and combinations thereof.

The proppant-carrying fluid may include any concentration and/or amount of proppants that may be suspended in the fluid and is sufficient to form "pillars" within the formation. In certain embodiments, the concentration of proppants in the proppant-carrying fluid may range from about 0.5 to about 27.0 lb/gal. In other embodiments, it may range from about 1.0 to about 4.0 lb/gal, and in some embodiments, from about 1.5 to about 2.5 lb/gal (including any amount and/or endpoint range of 0.1 lb/gal increments between 0.5 and 27.0 lb/gal). In certain embodiments, higher proppant concentrations may be feasible for later treatment stages of many applications, but could cause screenouts in the earlier stages of those treatments. A person of ordinary skill in the art with the benefit of this disclosure will recognize suitable concentrations of proppants to be used in various embodiments and applications of the present disclosure.

In certain embodiments, one or more consolidating agents may be used, among other reasons, to at least partially consolidate loose proppants, to strengthen the proppants and/or pillars formed therefrom in the formation, and/or to reduce or prevent their flowback out of the well when fluids are produced out of the formation. In such embodiments, any suitable consolidating agent may be used, including but not limited to tackifying agents (e.g., non-aqueous tackifying agents, aqueous tackifying agents, emulsified tackifying agents, etc.), silyl-modified polyamide compounds, resins, crosslinkable aqueous polymer compositions, polymerizable organic monomer compositions, consolidating agent emulsions, zeta-potential modifying aggregating compositions, binders, any combinations thereof, and the like. In certain embodiments, the consolidating agent(s) may be pre-coated onto the surface of the proppants. In certain embodiments, the consolidating agent(s) may be included in a carrier fluid in which the proppants are suspended, or the proppants may be contacted with the consolidating agent via another treatment fluid introduced into the region of the formation where the proppants have been deposited.

In certain embodiments, the treatment fluids used in the methods and systems of the present disclosure optionally may comprise one or more gelling agents, which may comprise any substance that is capable of increasing the viscosity of a fluid, for example, by forming a gel. Examples of gelling agents that may be suitable for use in accordance with the present disclosure include, but are not limited to guar, guar derivatives (e.g., hydroxyethyl guar, hydroxypropyl guar, carboxymethyl guar, carboxymethylhydroxyethyl guar, and carboxymethylhydroxypropyl guar ("CMHPG")), cellulose, cellulose derivatives (e.g., hydroxyethyl cellulose, carboxyethylcellulose, carboxymethylcellulose, and carboxymethylhydroxyethylcellulose), biopolymers (e.g., xanthan, scleroglucan, diutan, etc.), starches, chitosans, clays, polyvinyl alcohols, acrylamides, acrylates, viscoelastic surfactants (e.g., methyl ester sulfonates, hydrolyzed keratin, sulfosuccinates, taurates, amine oxides, ethoxylated amides, alkoxylated fatty acids, alkoxylated alcohols, ethoxylated fatty amines, ethoxylated alkyl amines, betaines, modified betaines, alkylamidobetaines, etc.), combinations thereof, and derivatives thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound. In certain embodiments, the gelling agent may be "crosslinked" with a crosslinking agent, among other reasons, to impart enhanced viscosity and/or suspension properties to the fluid. The gelling agent may be included in any concentration sufficient to impart the desired viscosity and/or suspension properties to the fluid. In certain embodiments, the gelling agent may be included in an amount of from about 0.1% to about 10% by weight of the fluid. In other embodiments, the gelling agent may be present in the range of from about 0.1% to about 2% by weight of the fluid.

In certain embodiments, the clean fluid optionally may comprise one or more solid degradable or acid releasing (e.g., delayed-release acid) additives, including but not limited to acid-releasing degradable materials, encapsulated acids, and the like. For example, solid degradable or delayed-release acid additives may be included in the fluid that will form the external phase of emulsions of the immiscible fluids, among other reasons, in order to insure the stability of proppant pillars formed by the internal phase as well as any agents consolidating those proppants, all of which being compressed and cured during and after the closure of the fracture. The external phase liquids may help degrade these additives to produce acids. In certain embodiments, these solid additives may be provided in particulate form, and may be deposited in the proppant pack (e.g., interspersed with the proppant and/or between proppant pillars) when the clean fluid is removed from the formation (e.g., is produced out of the formation through the well, or leaks off elsewhere into the formation). When the hydraulic pressure used to create or enhance the fractures is released, these solid particulates may remain in place in the spaces between proppants and/or pillars of proppants when the fracture compresses, temporarily further stabilizing the fracture and/or proppant for some period of time after hydraulic pressure is released. At some point thereafter, the solid additives may degrade, melt, or release one or more acids (e.g., via hydrolysis of the material itself, degradation of the acid's encapsulant, etc.) that may react with rock and/or other materials in the fracture, creating conductive open spaces and/or channels in the formation and/or proppant pack into which hydrocarbons such as crude oil may flow. Examples of acid-releasing degradable materials that may be suitable for use in certain embodiments of the present disclosure include, but are not limited to: esters; lactides; glycolides; ε-caprolactones; hydroxy ester ethers; hydroxybutyrates; anhydrides; carbonates; orthoesters; amino acids; ethylene oxides; phosphazenes; ether esters; amides; formates; formate esters; polyesters (e.g., aliphatic polyesters); poly(lactides); poly(glycolides); poly(ε-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly(ether esters); polyester amides; polyamides; and polymers, copolymers or blends thereof. An example of a commercially-available delayed-release acid additive that may be suitable for use in certain embodiments of the present disclosure is BioVert™ H150, available from Halliburton Energy Services, Inc. The amount(s) of delayed-release acid additives included in a clean fluid according to certain embodiments of the present disclosure may vary depending on a number of factors, including but not limited to the particulate suspension capacity of the clean fluid, the size and amount(s) of open spaces to be created between the proppant pillars, and the like. A person of ordinary skill in the art with the benefit of this disclosure will recognize the appropriate amount of such delayed-release acid additives to include in a particular application of the present disclosure.

In certain embodiments, the treatment fluids used in the methods and systems of the present disclosure optionally may comprise any number of additional additives. Examples of such additional additives include, but are not limited to, salts, surfactants, acids, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, gelling agents, breakers, weighting agents, relative permeability modifiers, consolidating agents, resins, wetting agents, coating enhancement agents, filter cake removal agents, antifreeze agents (e.g., ethylene glycol), and the like. For example, in certain embodiments, one or more surfactants may be used to increase the surface tension of the proppant-carrying fluid and/or decrease the surface tension of the clean fluid, among other reasons, to form the proper type of emulsion for certain embodiments of the present disclosure. In certain embodiments, one or more of these additional additives (e.g., a crosslinking agent) may be added to the treatment fluid and/or activated after a viscosifying agent has been at least partially hydrated in the fluid. A person skilled in the art, with the benefit of this disclosure, will recognize the types of additives that may be included in the fluids of the present disclosure for a particular application.

The methods, compositions, and systems of the present disclosure may be used during or in conjunction with any subterranean fracturing operation. For example, one or more fracturing fluids (including but not limited to, the proppant-carrying fluids and clean fluids of the present disclosure) may be introduced into the formation at or above a pressure sufficient to create or enhance one or more fractures in at least a portion of the subterranean formation. Such fractures may be "enhanced" where a pre-existing fracture (e.g., naturally occurring or otherwise previously formed) is enlarged or lengthened by the fracturing treatment. Other suitable subterranean operations in which the methods and/or compositions of the present disclosure may be used include, but are not limited to, fracture acidizing, "frac-pack" treatments, and the like. In certain embodiments, the methods, compositions, and systems of the present disclosure may be used in a fracturing job sometimes referred to as a "zipper frac" operation, wherein one or more wells in a single subterranean formation and/or at a single site may be fractured substantially simultaneously.

The treatment fluids and/or fracturing fluids used in the methods and systems of the present disclosure may be prepared using any suitable method and/or equipment (e.g., blenders, stirrers, etc.) known in the art at any time prior to their use. In some embodiments, the fracturing fluids may be prepared at a well site or at an offsite location. In certain embodiments, an aqueous fluid may be mixed the gelling agent first, among other reasons, in order to allow the gelling agent to hydrate and form a gel. Once the gel is formed, proppants and/or other additives may be mixed into the gelled fluid. Once prepared, a fracturing fluid of the present disclosure may be placed in a tank, bin, or other container for storage and/or transport to the site where it is to be used. In other embodiments, a fracturing fluid of the present disclosure may be prepared on-site, for example, using continuous mixing or "on-the-fly" methods, as described below.

In certain embodiments of the present disclosure, the treatment/fracturing fluids may be pumped into the formation at pressure in alternating stages of proppant-carrying fluid and clean fluid. Alternating introduction of the aforementioned fluids may be achieved, in some embodiments, through a fluid pumping strategy such as pump cycling. Pump cycling may include any suitable means of accomplishing the alternating introduction of the stages fluids. In some embodiments, it may include alternating the fluid fed (e.g., alternating between feeding less-concentrated fluid and proppant-carrying fluid) into a single pump for pumping fracturing fluid downhole (e.g., down casing, tubing, and/or a wellbore penetrating a subterranean formation and then out into the subterranean formation). In certain embodiments, pump cycling may include using two or more pumps, each pumping a stage of fluid downhole in alternating succession. For example, where two pumps are used, a first pump fed by a reservoir of less-concentrated fluid may be cycled on, and then cycled off at substantially the same time that a second pump fed by a reservoir of particulate-laden fluid is cycled on. Then, the second pump may be cycled off at substantially the same time that the first pump is cycled back on again, and so on, such that the end result is the introduction of alternating stages of fluids into the subterranean formation.

In certain embodiments, the alternating intervals of proppant-carrying fluid and clean fluid may be accomplished by introducing the fracturing fluid comprising a lesser amount of particulates downhole via an annulus defined between the well bore and outer tubing or casing of the well and introducing a proppant or proppant-carrying fluid down the tubing or casing, or vice-versa, for intermixing downhole. The proppant-carrying fluid and clean fluid may be injected or introduced into the well bore at any location along the well bore. For example, the fluids may be introduced into a conduit or line at the surface upstream of the well head that communicates fluid into the well bore. In other embodiments, the fluids may be introduced through separate parallel lines that meet at the well head itself, and the alternating stages of the fluids may enter the well bore just below the wellhead. In other embodiments, separate conduits carrying the proppant-carrying fluid and the clean fluid may be disposed in the well bore, and the alternating stages may be introduced into the well bore and/or formation at some point below the surface. Various manifold and pump systems known in the art may be used to introduce the alternating stages of the proppant-carrying fluid and the clean fluid at the wellhead, downstream of the well head, and/or in the well bore below the surface in accordance with the present disclosure.

In some embodiments, a clean external phase fluid may be continuously pumped into the subterranean formation for substantially the entire duration of a fracturing treatment, while proppant and/or a proppant-carrying internal phase fluid may be intermittently injected into the clean external phase fracturing fluid, so as to result in alternating sequences of (i) a clean external phase fluid and (ii) a proppant-carrying internal phase fluid being introduced into the wellbore and/or the subterranean formation. That is, proppant may be injected into the fluid by various means, including intermittent injection of dry particulates into an internal-phase base fluid, and/or intermittent injection of a proppant-carrying internal phase fluid into the external phase fluid stream. In other embodiments, a continuous stream of proppant-carrying internal phase fluid may be pumped into the subterranean formation, with stages of a clean external phase fluid injected into the concentrated internal phase fluid stream, achieving a similar effect of alternating sequences of proppant-carrying internal phase fluid and clean external phase fracturing fluid introduced into the well bore and/or the subterranean formation. In certain embodiments following this approach, smaller pillars of proppant may be created. In certain embodiments, the external phase fluid may carry solid acid-releasing additives.

The volumes of the alternating stages of proppant-carrying fluid and clean fluid may be any volumes appropriate for the particular application of the methods and systems of the present disclosure depending upon, for example, the type of formation, well bore volume, and other factors. In certain embodiments of the present disclosure, the alternating stages of the immiscible fluids used herein may be somewhat larger in volume than alternating stages of different fluids used in other applications, among other reasons, to enhance separation of and reduce intermixing between the proppant-carrying fluid and the clean fluid in the well. However, in some embodiments, the volumes of the alternating stages of the immiscible fluids used herein may be similar to the volumes of alternating stages of different fluids used in other applications, or even smaller than those volumes. In certain embodiments, the volume of each stage of clean fluid and/or proppant-carrying fluid may range from about 100 gallons to about 5000 gallons. In certain embodiments, the volumetric ratio of the stages of proppant-carrying fluid (i.e., slurry volume) to clean fluid may be about 1:1 to about 10:1, which may be selected for a particular treatment based on various factors, including but not limited to compressive closure forces (either estimated or measured) in the formation. For example, in certain embodiments, if the formation is believed or observed to exhibit relatively high compressive forces, the volumetric ratio of the stages of proppant-carrying fluid to clean fluid may be increased, among other reasons, since additional quantities of proppant and/or thicker pillars of proppant may better withstand the higher compressive forces that attempt to close the fracture. However, a person of skill in the art with the benefit of this disclosure will understand when the volume ratios of the proppant-carrying fluid and clean fluid should be varied.

Figure 3:
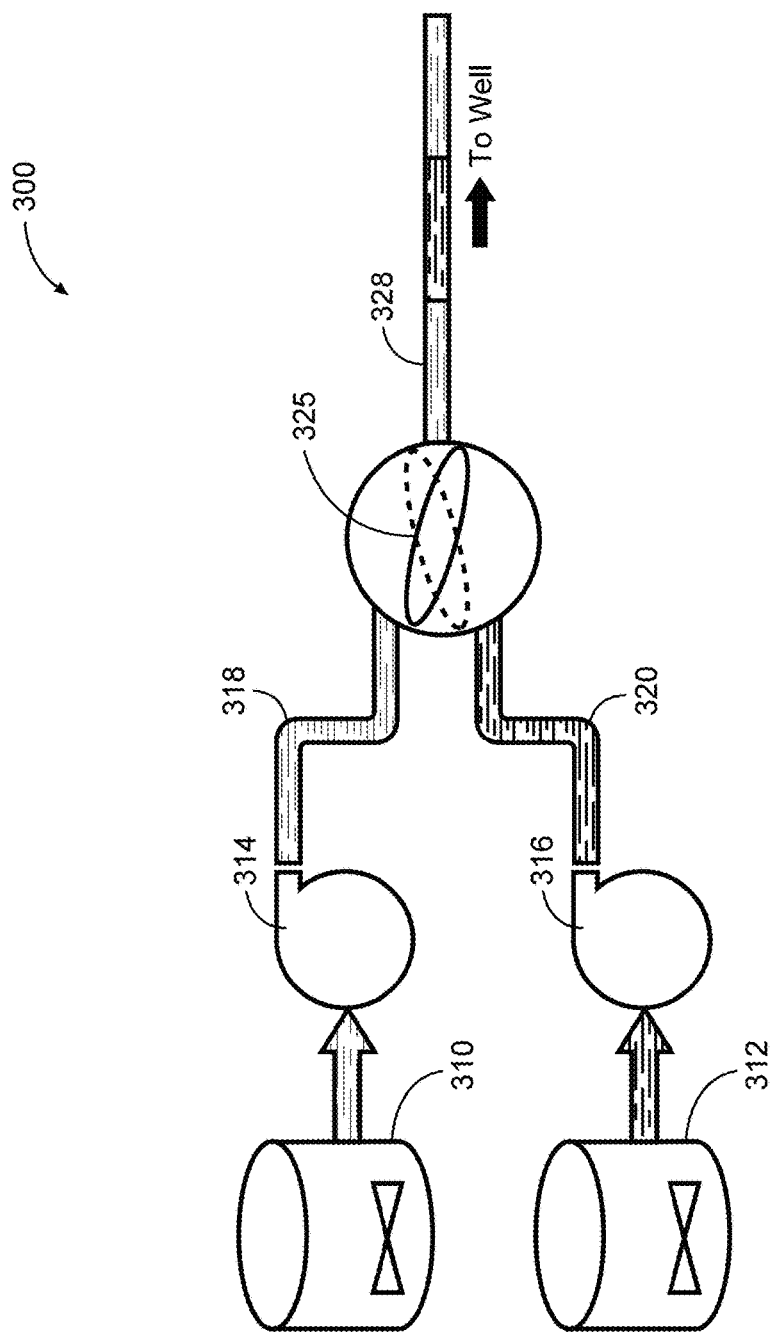
FIG. 3 is a diagram illustrating certain embodiments of single-well fracturing systems according to the present disclosure.

The methods and compositions disclosed herein may directly or indirectly affect one or more components or pieces of equipment associated with the preparation, delivery, recapture, recycling, reuse, and/or disposal of the disclosed compositions. For example, and with reference to FIGS. 3 and 4, the disclosed methods and compositions may directly or indirectly affect one or more components or pieces of equipment associated with fracturing systems 300 and 400, according to one or more embodiments. Referring now to FIG. 3, the fracturing system 300 shown includes a first blender 310 for preparing or mixing the clean fluid used according to the present disclosure, and a second blender 312 for preparing or mixing the proppant-carrying fluid used according to the present disclosure. The system 300 may also include base fluid sources, proppant sources/hoppers, degradable additive sources/hoppers, acid-releasing additive sources/hoppers, and/or other additive sources (not shown), as well as metering devices that may be used to direct desired amounts of these components into blender 310 and/or 312 for mixing. Once the fluids are prepared in blenders 310 and 312, each fluid may be conveyed via a boost pump 314 or 316 into their respective fluid lines or conduits 318 or 320 that flow into a common fluid line or conduit 328 that flows into a well bore penetrating a subterranean formation. Upstream of conduit 328, the fluid lines 318 and 320 may each go through one or more valves, such as a three-way valve 325 as shown. In certain embodiments, valve 325 may comprise any suitable type of valve, for example, a butterfly valve that may allow fluid from either fluid line 318 or 320 to enter fluid line 328. In certain embodiments, valve 325 may be controlled via a hydraulic system or electronic/motorized controls, which may be controlled by an operator at a well site or from a remote location via an electronic communication system. However, valve 325 optionally may be replaced with separate valves for each of fluid lines 318 and 320, as well as additional valves controlling flow of fluids to the well bore. The action of valve 325 may create the alternating intervals of the proppant-carrying fluid and the clean fluid pumped into a well bore in certain embodiments of the present disclosure. As noted above, one or more of the fluids pumped into the well bore via conduit 328 may be introduced into the well bore at or above sufficient pressure to create or enhance one or more fractures in the subterranean formation. This pressure may be achieved by the hydraulic pressure of the fluid itself, boost pumps 314 and 316, and/or with the use of additional pumping equipment (not shown). Also, as previously discussed, system 300 may further include manifold and pump systems (not shown) known in the art that are configured to introduce the alternating stages of the proppant-carrying fluid and the clean fluid at a wellhead, downstream of a well head, and/or in the well bore below the surface in accordance with the present disclosure. Finally, system 300 may further include bypass conduits, valves, or other equipment (not shown) to allow the system to maintain hydraulic pressure with both fluids simultaneously even though they are being alternately pumped into the well.

Figure 4:
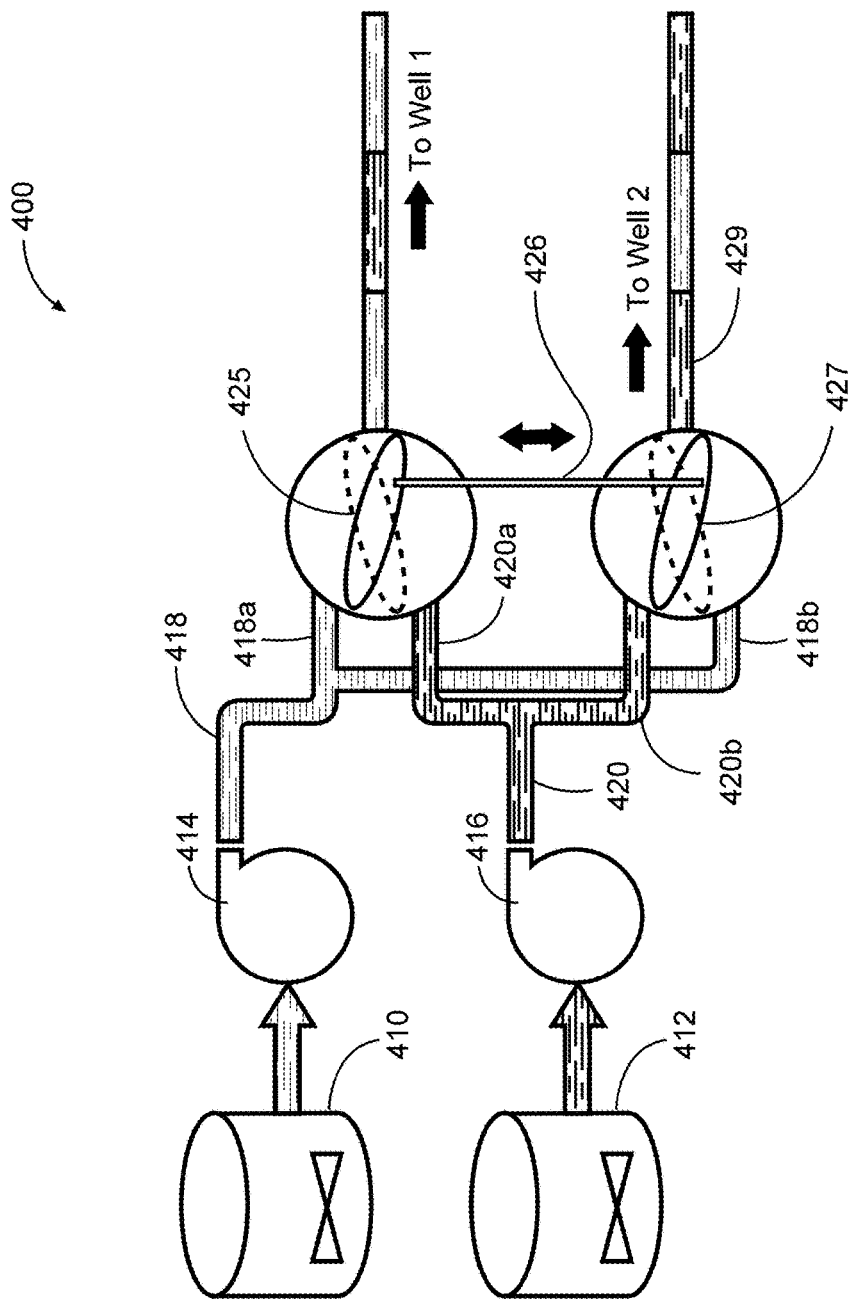
FIG. 4 is a diagram illustrating certain embodiments of dual-well fracturing systems according to the present disclosure.

Referring now to FIG. 4, another embodiment of a fracturing system 400 is shown. This system also includes a first blender 410 for preparing or mixing the clean fluid and a second blender 412 for preparing or mixing the proppant-carrying fluid, as well as two boost pumps 414 and 416 for pumping those fluids through the rest of the system. However, the system 400 as shown is further configured to perform fracturing operations in two different well bores in a manner that does not require additional blenders or boost pumps. As shown each of fluid lines or conduits 418 and 420 (carrying the clean fluid and proppant-carrying fluid, respectively) are split into two portions or branches, where conduits 418a and 420a flow into conduit 428 that flows into a first well bore, and conduits 418b and 420b flow into conduit 429 that flows into a second well bore. Upstream of conduits 328 and 329, each pair of conduits 418a/420a and 418b/420b go through one or more valves, such as a three-way valves 425 and 427, similar to valve 325 described in FIG. 3. In certain embodiments, valves 425 and 427 may be connected via a tandem system 426 or other connection which is configured to ensure that fluid from line 418 or 420 is only permitted to flow through one of the valves at any given time. In other embodiments, valves 425 and 427 may be replaced with a single valve mechanism that is capable of achieving similar action and flow. The action of valves 425 and 427 may create the alternating intervals of the proppant-carrying fluid and the clean fluid pumped into two well bores substantially simultaneously in certain embodiments of the present disclosure. In certain embodiments, the system shown in FIG. 4 may allow fluid from each of blenders 410 and 412 and boost pumps 414 and 416 to be constantly flowing into downstream portion of the system and/or the well bore, which may allow the system to maintain hydraulic pressure of both fluids within the system without the need for bypass equipment.

An embodiment of the present disclosure is a method comprising: introducing into a well bore penetrating a portion of a subterranean formation alternating stages of a first treatment fluid comprising one or more proppants, and a second treatment fluid comprising a lesser concentration of proppants than the first fluid, wherein the first fluid and the second fluid are substantially immiscible in one another, and wherein the alternating stages of the first and second treatment fluids are introduced into the well bore at or above a pressure sufficient to create or enhance one or more fractures in the subterranean formation.

Another embodiment of the present disclosure is a system comprising: a first treatment fluid mixing apparatus for preparing a first treatment fluid comprising one or more proppants; a second treatment fluid mixing apparatus for preparing a second treatment fluid comprising a lesser concentration of proppants than the first treatment fluid; a first valve that controls the flow of the first and second treatment fluids from the first and second treatment fluid mixing apparatus into a first well bore penetrating a portion of a subterranean formation; a second valve that controls the flow of the first and second treatment fluids from the first and second treatment fluid mixing apparatus into a second well bore penetrating a portion of the subterranean formation; wherein the first and second valves are configured to introduce the first and second treatment fluids into the first and second well bores in alternating stages.

Another embodiment of the present disclosure is a method comprising: introducing into a well bore penetrating a portion of a subterranean formation alternating stages of a proppant-carrying treatment fluid comprising an oil-based fluid and one or more proppants, and a clean treatment fluid comprising an aqueous-based fluid and one or more one or more solid acid-releasing additives, wherein the alternating stages of the proppant-carrying treatment fluid and the clean treatment fluid are introduced into the well bore at or above a pressure sufficient to create or enhance one or more fractures in the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:
1. A method comprising:
  introducing into a well bore penetrating a portion of a subterranean formation alternating stages of:
    a first treatment fluid comprising an oil-based fluid and one or more proppants, and a second treatment fluid comprising an aqueous based fluid and a lesser concentration of proppants than the first treatment fluid,
  wherein the first treatment fluid and the second treatment fluid are immiscible in one another,
  wherein the alternating stages of the first and second treatment fluids are introduced into the well bore at or above a pressure sufficient to create or enhance one or more fractures in the subterranean formation, and
  wherein the alternating stages of the first and second treatment fluids are introduced into the well bore in a volumetric ratio of the first treatment fluid to the second treatment fluid of from about 1:1 to about 10:1;
allowing globs of the first treatment fluid to form in the well bore at an interface between the first treatment fluid and the second treatment fluid,
  wherein the globs are separated by the second treatment fluid; and
allowing one or more pillars of proppant to form in the one or more fractures in the subterranean formation.

2. The method of claim 1 wherein the second treatment fluid does not comprise a significant concentration of proppants.

3. The method of claim 1 wherein at least a portion of the first and second treatment fluids form an emulsion with the first treatment fluid in an internal phase of the emulsion.

4. The method of claim 1 wherein the first treatment fluid has a higher surface tension than the second treatment fluid.

5. The method of claim 1 wherein the first treatment fluid comprises the one or more proppants in a concentration of from about 0.5 lb/gal to about 27.0 lb/gal.

6. The method of claim 1 wherein at least a portion of the proppants in the first treatment fluid are at least partially coated with a consolidating agent.

7. The method of claim 1 wherein the alternating stages of the first and second treatment fluids are introduced into the well bore in a volumetric ratio of the first treatment fluid to the second treatment fluid that is selected based at least in part on an amount of compressive closure force in the portion of the subterranean formation.

8. The method of claim 1 wherein the second treatment fluid comprises one or more solid acid-releasing additives.

9. A method comprising:
introducing into a well bore penetrating a portion of a subterranean formation alternating stages of:
  a first treatment fluid comprising an aqueous-based fluid and one or more proppants, and
  a second treatment fluid comprising an oil-based fluid and a lesser concentration of proppants than the first treatment fluid,
    wherein the first treatment fluid and the second treatment fluid are immiscible in one another,
    wherein the alternating stages of the first and second treatment fluids are introduced into the well bore at or above a pressure sufficient to create or enhance one or more fractures in the subterranean formation, and
    wherein the alternating stages of the first and second treatment fluids are introduced into the well bore in a volumetric ratio of the first treatment fluid to the second treatment fluid of from about 1:1 to about 10:1;
allowing globs of the first treatment fluid to form in the well bore at an interface between the first treatment fluid and the second treatment fluid,
  wherein the globs are separated by the second treatment fluid; and
allowing one or more pillars of proppant to form in the one or more fractures in the subterranean formation.

10. The method of claim 9 wherein at least a portion of the first and second treatment fluids form an emulsion with the first treatment fluid in an internal phase of the emulsion.

11. The method of claim 9 wherein the first treatment fluid comprises the one or more proppants in a concentration of from about 0.5 lb/gal to about 27.0 lb/gal.

12. The method of claim 9 wherein the first treatment fluid has a higher surface tension than the second treatment fluid.

* * * * *